(12) United States Patent
Halberstadt

(10) Patent No.: US 7,944,716 B2
(45) Date of Patent: May 17, 2011

(54) CONTROL OF A RESONANT CONVERTER

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 580 days.

(21) Appl. No.: 11/910,447

(22) PCT Filed: Mar. 24, 2006

(86) PCT No.: PCT/IB2006/050910
§ 371 (c)(1),
(2), (4) Date: Jun. 3, 2008

(87) PCT Pub. No.: WO2006/103609
PCT Pub. Date: Oct. 5, 2006

(65) Prior Publication Data
US 2008/0266908 A1      Oct. 30, 2008

(30) Foreign Application Priority Data

Apr. 1, 2005  (EP) .................................. 05102601
May 19, 2005 (EP) .................................. 05104271

(51) Int. Cl.
*H02M 3/335* (2006.01)
(52) U.S. Cl. ........................ 363/25; 323/235; 315/291
(58) Field of Classification Search .............. 363/16–20, 363/24–25, 21.04, 21.07, 97, 65, 131; 323/235, 323/222, 271, 282–284; 315/194, 291, 224, 315/247, 307, 244
See application file for complete search history.

(56) References Cited

U.S. PATENT DOCUMENTS

| | | | |
|---|---|---|---|
| RE33,866 E |   | 3/1992 | Schutten et al. |
| 5,159,541 A | * | 10/1992 | Jain .................................. 363/26 |
| 5,615,093 A | * | 3/1997 | Nalbant .......................... 363/25 |
| 6,178,009 B1 |   | 3/2001 | Schutten et al. |

OTHER PUBLICATIONS

Oruganti R., et al. : "Resonant-Tank Control of Parallel Resonant Converter," Proceedings of the International Telecommunications Energy Conference, IEEE, vol. Conf. 13, XP010040478, ISBN: 0-87942-670-5, pp. 330-337, (May 11, 1991).

Natarajan, K., et al. : "Optimal Trajectory Control of Constant Frequency Series Resonant Converter," Proceedings of the Annual Power Electronics Specialists Conference, IEEE, vol. Conf. 24, XP010149061, ISBN: 0-7803-1243-0, pp. 215-221, (Jun. 20, 1993).

* cited by examiner

*Primary Examiner* — Rajnikant B Patel

(57) ABSTRACT

The invention deals with the control of a resonant LLC converter by use of control parameters. The primary current flowing in the resonant tank and a voltage at a predetermined point in the resonant tank are monitored and control parameters are set for a high side conduction interval and control parameters are set for a low side conduction interval, the control parameters for the two conduction intervals being: a peak current of the interval and a predetermined voltage of the interval. The resonant converter comprises series-arranged controllable switches to be connected to the supply source. The resonant converter is operated by setting up criteria for turning off a switch in accordance with criteria including the four control parameters.

11 Claims, 7 Drawing Sheets

CONTROL OF A RESONANT CONVERTER

FIELD OF THE INVENTION

The invention relates to control of a resonant converter, and in particular to control of the resonant converter by use of control parameters.

BACKGROUND OF THE INVENTION

In a state of the art resonant LLC converter, a resonant capacitor and two inductors form a resonant circuit, possible in connection with additional components. The converter further includes a transformer and rectifier circuit that is used to create a DC output voltage. The output current can be made continuous by adding a series inductance in the rectifier circuit. A lot of variations exist for this type of converter, including rectification with a bridge rectifier or no rectification at all as used in a lighting application. Also the transformer can be left out in some cases.

In order to achieve satisfactory operation of a resonant converter, it is important that the switches for generating an alternating current are switched on and off at the right instant. A frequency at which the switches are operated defines a mode of operation of the converter.

The state of the art converter is usually controlled by a frequency with 50% duty cycle by a control logic circuit, where the output power of the converter is controlled by varying the operating frequency. It is also possible to use a duty cycle different from 50%. In this case also the duty cycle determines the output power.

This control principle by frequency gives some important disadvantages:
  When controlled by a frequency, the voltages and currents in the resonant part at the start of each time interval (high side or low side conduction interval) are not only depending on the frequency, but also on the history of previous conduction strokes. This history gives rise to rather large transient responses and more complicated stability issues of the control loop, especially if the converter operates close to resonance.
  For modern designs, efficiency at low load and input power during standby (no output power taken) have become a major issue. With the traditional 50% duty cycle control this issue is difficult to solve, because of the large circulating energy at low load. A solution for this is burst mode, but burst mode is not always allowed, because of the large ripple at the output. Also sudden changeover from normal mode to burst mode or back can give intolerable transients at the output.
  Operation at low duty cycles is a solution to keep large efficiency at low power. Varying the duty cycle at a fixed frequency can however give intolerable change in sign of the loop gain.

U.S. Pat. No. 6,711,034 discloses a resonant converter where the frequency of the switch conduction times are controlled by a timer, while asymmetry in secondary diode currents is compensated by measuring an electrical magnitude, for example the primary current.

SUMMARY OF THE INVENTION

The present invention seeks to provide an improved resonant converter. The invention is defined by the independent claims. The dependent claims define advantageous embodiments.

An embodiment of the present invention provides improved means to control the converter so that a simpler, more robust and cheaper resonant converter may be provided. Preferably, the invention alleviates, mitigates or eliminates one or more of the above or other disadvantages singly or in any combination.

In an embodiment of the invention, a resonant converter is provided where state variables are monitored and where a control algorithm is implemented so that the resonant converter is operated in accordance with criteria set up from control parameters. The current flowing in the resonant tank is also referred to as the primary current.

Operating the resonant converter in this manner gives rise to a number of advantages. By operating the switches directly from monitoring the primary current and the voltage at a predetermined point, a faster control and better stability of the system can be provided. Furthermore, from the setting of the criteria and/or the setting of the control parameters, one may directly include safety features, such as shorted output protection. Even further, a smooth combination of high output power at 50% duty cycle may be combined with high efficient low output power/standby mode, by setting up criteria where different criteria are taking different aspects into account, and even allows operating at duty cycles different from 50% if desired. An even further advantage is that a symmetrically controlled converter can be obtained if necessary. It should be noted that the scope of this patent also covers an embodiment in which the predetermined voltage is replaced by an indirect measurement as explained hereinafter in connection with FIG. 7.

The optional features of claim 2 are advantageous since in addition to setting up specific criteria of the primary current and the voltage at a predetermined point in relation to the control parameters, it may be ensured that although a criterion is fulfilled in the beginning of a conduction interval, it can be disregarded. It is to be understood that the fulfillment of the criterion that a minimum time has lapsed, is not necessarily obtained by a timer means. This may e.g. also be obtained from a known development of the primary current and/or the voltage at a predetermined point in relation to a specific criterion, or other equivalent means.

The optional features of claim 3 are advantageous since a versatile resonant converter may be provided since a dedicated converter circuit is not necessary in order to operate the resonant converter in a desired operation mode.

The optional features of claim 4 are advantageous since a more stable resonant converter may be provided since the stabilization is not done directly on state variables which may exhibit transient responses, ripples, bursts, etc.

The optional features of claim 5 are advantageous since a versatile resonant converter may be obtained since a dedicated converter circuit may not be necessary in order to operate the resonant converter in modes with different output power.

The optional features of claims 6 and 7 are advantageous since it may be avoided to specify a plurality of control parameters in order to operate the resonant converter in a given operation mode, since relations between the control parameters may be taken into account by the single operation parameter.

The optional features of claim 8 are advantageous since by taking the supply voltage and the operation frequency of the converter into the control of the resonant converter, a direct relation between the control parameter and the output power can be obtained.

According to additional aspects of the invention there are provided control logic for controlling a resonant converter, a method of controlling a resonant converter and a computer readable code to perform the steps of the method. In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF PREFERRED EMBODIMENTS

Figure 1:
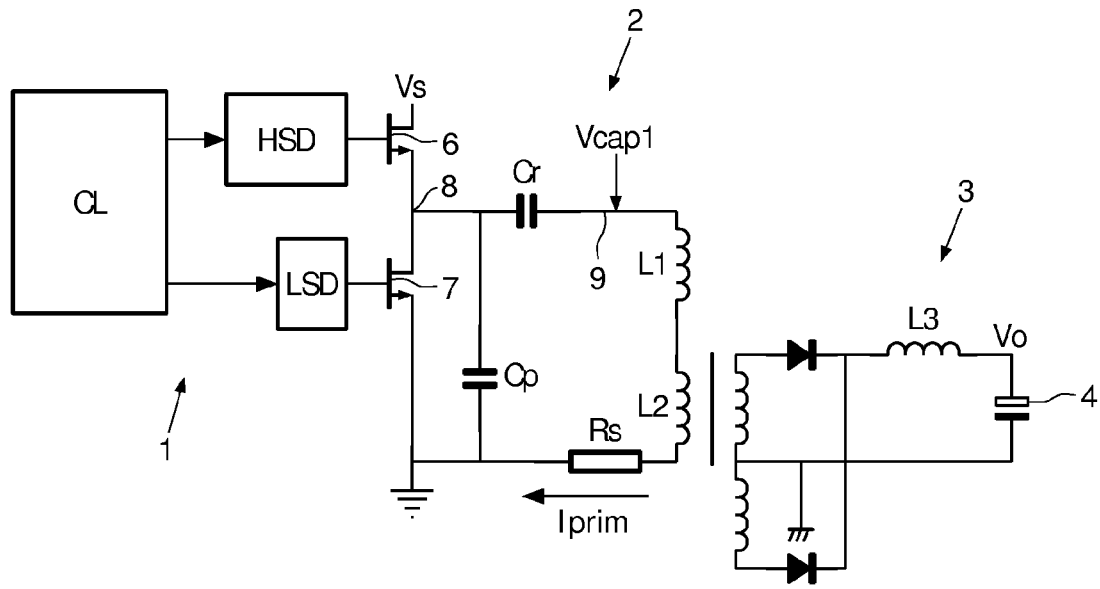
FIG. 1 illustrates a first embodiment of a resonant converter.
Figure 6:
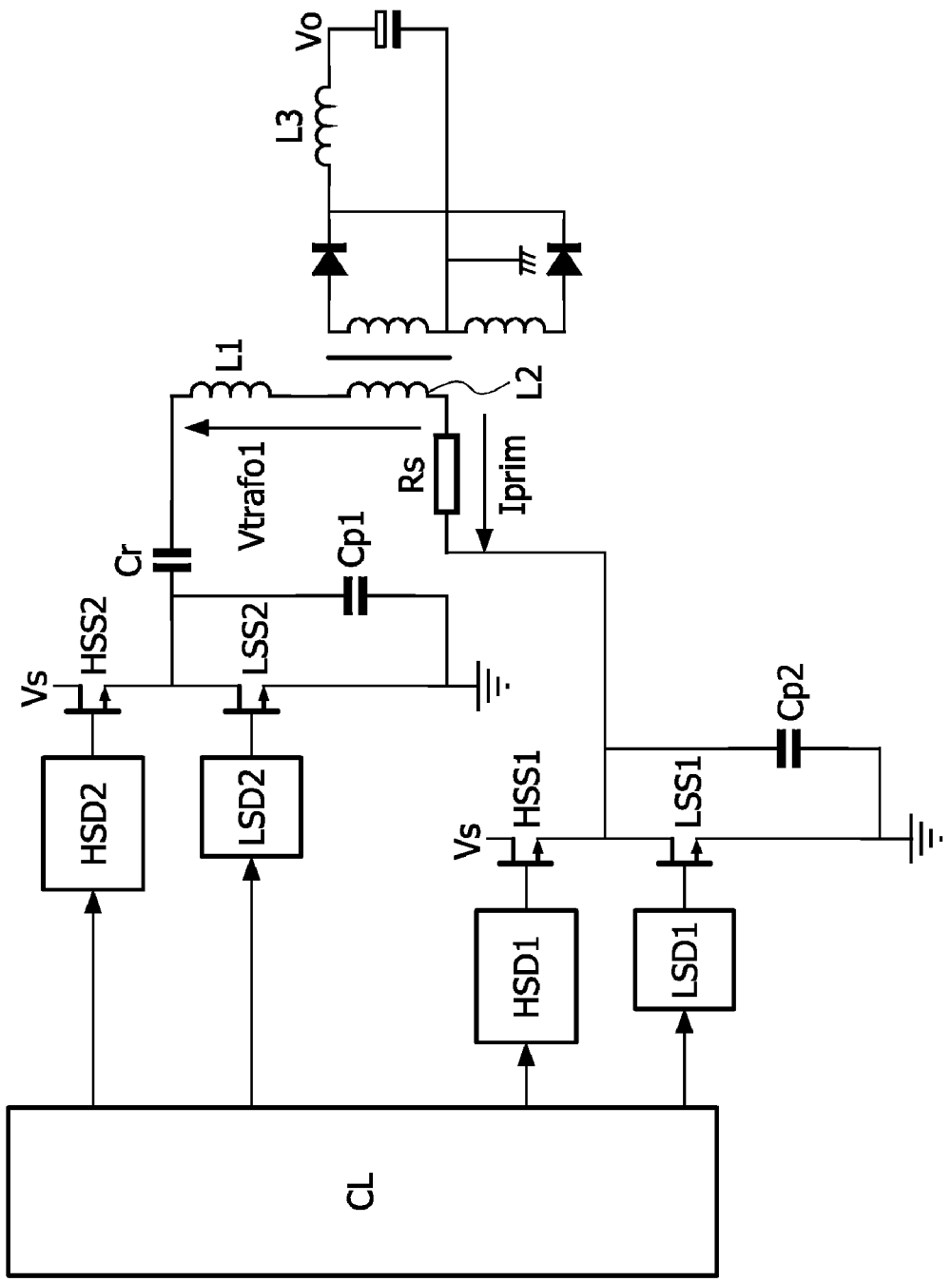
FIG. 6 illustrates an embodiment of a full bridge configuration.

An embodiment of a resonant converter is illustrated in FIG. 1. The circuit is a resonant LLC converter comprising the resonant capacitor Cr and the inductors L1 and magnetizing inductance L2, components that form part of a resonant circuit or a resonant tank. A transformer and rectifier circuit is used here to create a DC output voltage V0. The output current can be made continuous by adding a series inductance L3. The circuit comprises three parts. A first part 1 is the control part, which comprises a control logic CL for generating control signals for opening and closing the switches 6, 7 by means of drivers HSD and LSD. A second part 2 is the primary circuit, and a third part 3 is the secondary circuit. The resonant converter is connected to a voltage supply Vs so that electrical energy may be supplied a load that e.g. may be connected to the output terminals 4 at the secondary side. The resonant converter comprises first 6 and second 7 series-arranged, controllable switches that are connected to the supply source, the first switch being a high side switch (HSS), the high side switch being connected at one leg to the supply source Vs, the second switch being a low side switch (LSS), the low side switch been connected at one leg to ground. Also an embodiment with a full bridge configuration can be envisioned. An embodiment of a full bridge configuration is illustrated in FIG. 6 and discussed in the corresponding text.

The converter is usually controlled by the frequency with 50% duty cycle by the block CL. The output power of the converter may be controlled by variation of the operating frequency. It is also possible to use a duty cycle different from 50%. In this case also the duty cycle determines the output power. The present invention deals with a new and inventive way of operating a resonant converter.

In the converter according to the present invention the duty cycle and frequency variation may be combined in such a way that a smooth regulation of the output power can be realized. The converter is however not controlled by frequency and duty cycle directly, but with current and voltage at the primary side of the transformer. Therefore the variables Iprim and Vcapl as indicated in FIG. 1 are used. These two variables are compared each conduction interval with two control values, the converter is thus controlled in a cycle-by-cycle manner. The current Iprim is the current flowing in the resonant tank in accordance with the opening and closing the switches. Measurement of the current may be provided in any other equivalent way, e.g. from the voltage over Rs, the current in a switch, etc. The current Iprim is also referred to as the primary current. Vcapl is also referred to as the capacitor voltage; the voltage Vcapl is the voltage at the predetermined point. The predetermined point being, in this embodiment, the point indicated by reference numeral 9.

A first conduction interval occurs while the first switch is turned on and a second conduction interval occurs while the second switch is turned on. The two control parameters for the first conduction interval and second conduction interval, are the peak current of the interval and a predetermined voltage present at the Vcapl point.

The first and second switch are turned off in accordance with criteria including the four control parameters: IpeakH, VcapH being the control parameters during the high side switch conduction interval, and IpeakL, VcapL being the control parameters during the low side switch conduction interval.

The high side switch and low side switch are turned off in accordance with the following criteria or control algorithm; the control algorithm is operated by the control logic (CL):

HSS turn off:
1) [primary current>IpeakH] OR
2) [top reached at Vcapl] AND [Vcapl<VcapH]
LSS turn off:
3) [primary current<IpeakL] OR
4) [valley reached at Vcapl] AND [Vcapl>VcapL]

A top or a valley detection in a primary current may give rise to practical problems due to the differentiating action in combination with noise and disturbance. A top or a valley in Vcap is equivalent with primary current >0 or primary current <0 respectively. Therefore an equivalent control algorithm is:

HSS turn off:
1A) [primary current>IpeakH] OR
2A) [primary current>0] AND [Vcapl<VcapH]
LSS turn off:
3A) [primary current<IpeakL] OR
4A) [primary current<0] AND [Vcapl>VcapL]

In this embodiment, the four control parameters are consequently:
–IpeakH, IpeakL, VcapH and VcapL With the control algorithm the initial states at the start of each conduction interval are more closely related to the control variables. Therefore the history of previous cycles is of less influence.

In the following different embodiments are described where the control parameters are specified in more detail and elaborated further.

The high side switch (HSS) and the low side (LSS) switch may be turned on using different operation schemes, for example HSS/LSS-turn on may be determined by adaptive non-overlap or fixed non-overlap or another criterion according to the state of art technology. This means that the opposite switch is turned on after a fixed time after the conducting switch was turned off. It is also possible to switch the opposite switch on after it is detected that the half bridge has commutated. This is called adaptive non-overlap and can for example be realized by sensing the dV/dt at the half bridge point. The scope of the present invention deals with the criteria for turning off a specific switch, however in order to drive the converter a switch is turned on again, as explained above.

The resonant converter may be operated in a desired operation mode by setting the control parameters to specific values, for example may a standby mode be realized by giving the following values to the control variables:

IpeakH=fixed value, the fixed value being determined according to desired output power and commutation energy.

IpeakL=large negative value, this ensures that control algorithm is not determined by this parameter.

VcapH=value lower than Vcapl at the end of the high side switch conduction stroke, this ensures that control algorithm is not determined by this parameter.

VcapL=value close to 0, this ensures that the low side switch is turned off the moment that Iprim is at its maximum negative value.

When IpeakH is increased, output power is increased. At a certain output power, VcapH takes over the control and IpeakH is no longer determining the conduction interval of the high side switch. In this way a smooth control of the output power is possible, without sudden changes in output power or change in sign of the loop gain.

The insight that the output power may be controlled by setting proper boundary conditions on the four control parameters may be elaborated further.

It can be calculated that the converted energy is almost proportional to the voltage difference between Vcapl at the start and the end of the conduction interval, because the operating frequency of the converter is almost constant. Therefore Vcapl was chosen as a state parameter, starting at the top or valley in Vcapl, because before the top/valley energy is delivered to Cr and after the top this energy is delivered from Cr to the rest of the resonant tank and the load. An almost linear transfer from Vcapl to output power is thereby given. It is an advantage that the transfer is a linear function, which further indicates that Vcapl is a good parameter to use in the control algorithm.

The following equation can be derived that describes the output power of the converter:

$$Pout=[Vsupply-(VcapH-VcapL)] \times (Cr \times Fswitch \times Vsupply) \times eff$$

Where eff is the efficiency of the converter.
From this equation it may be concluded that:
Vsupply−(VcapH−VcapL) is an indication of the output power
50% duty cycle occurs when VcapL=−VcapH
<>50% duty cycle occurs when VcapL<>−VcapH
Power is decreased at varying duty cycle as long as [Vsupply−(VcapH−VcapL)]×(Cr×Fswitch×Vsupply) is decreasing.
Other control protocols may be envisioned:
For high/medium load use VcapH=−VcapL to determine the end of the switch conduction interval, giving 50% duty cycle.
For low load use Ipeak during HSS conduction (IpeakH) and VcapL=0 (gives dI/dt=0 at maximum negative current) to get the desired low duty cycle mode.
For the takeover region between the two duty cycle modes, increase VcapL to 0 while decreasing Vsupply−(VcapH−VcapL).

This leads to the following realization:
One operation parameter Poutrel to control the output power $$Pout=eff \times Vsupply^2 \times (1-[VcapH-VcapL]/Vsupply) \times Cr \times Fswitch$$

$$Pout=eff \times Vsupply^2 \times Poutrel \times Cr \times Fswitch.$$

$$Poutrel=1-[VcapH-VcapL]/Vsupply$$

Inspection of Poutrel in further detail reveals that there are three regions of the parameter:
Region 1 (R1): Poutrel>Prelborder:

$$VcapH=Vsupply/2[1-Poutrel]$$

$$VcapL=-Vsupply/2[1-Poutrel]$$

Region 2 (R2): Poutrel<Prelborder and VcapL<0:

$$VcapL=-Vsupply/2[1-Poutrel]+Vsupply \times K2 \times (Poutrelborder-Poutrel)$$

$$VcapH=Vsupply/2[1-Poutrel]+Vsupply \times K2 \times (Poutrelborder-Poutrel)$$

Region 3 (R3): Otherwise:

$$VcapL=0$$

$$VcapH=Vsupply/[1-Poutrel]$$

The constant K2 defines the width of region 2. K2 is chosen larger than a certain minimum, so that takeover from VcapH control to IpeakH control preferably takes place somewhere in the K2 region, while at the take over point the amplitude of IpeakH has not passed a local maximum during the HSS conduction interval. K2 is also chosen smaller than a certain maximum, so that takeover from VcapH control to IpeakH control preferably takes place while at the take over point the amplitude of IpeakH is larger than a certain minimum.

Figure 2:
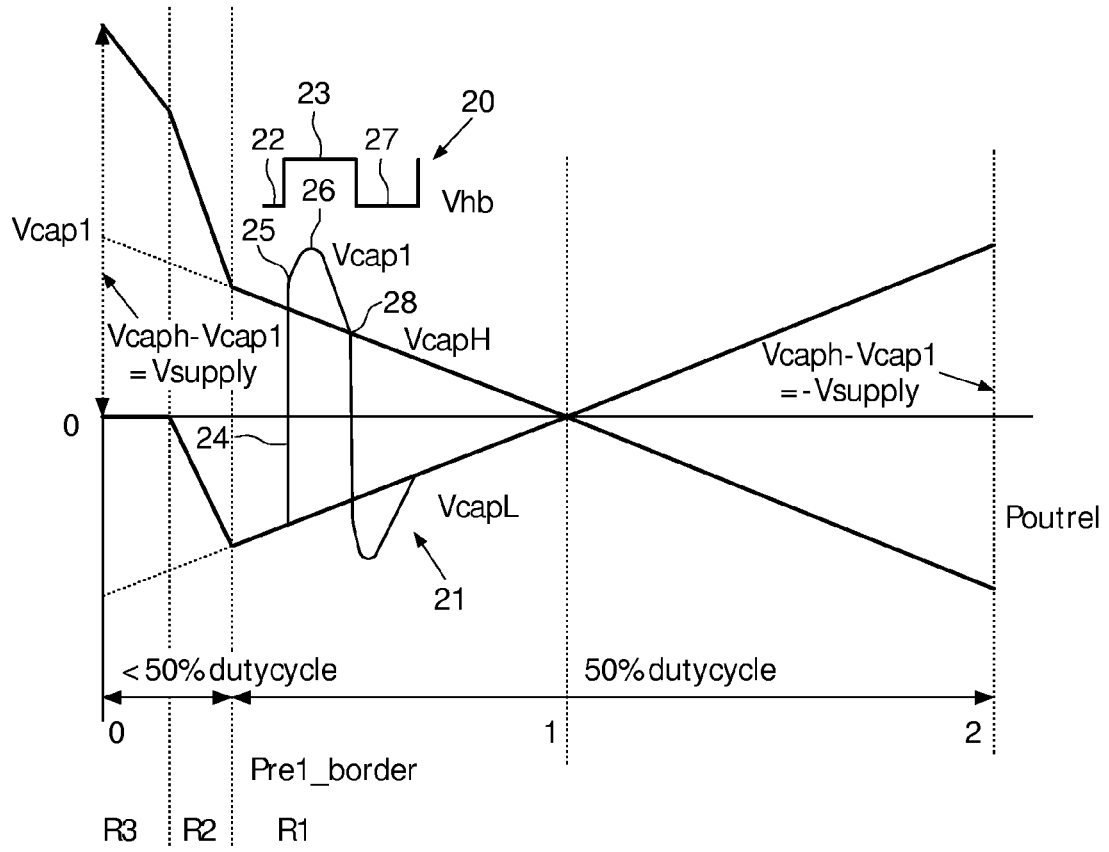
FIG. 2 illustrates Vcapl as a function of Poutrel in the range of 0 to 2.

FIG. 2 illustrates the behavior of Vcapl as a function of Poutrel in the range of 0 to 2. In region 3 is VcapL equal to zero, whereas VcapH decreases from a high positive value. In region 2 both VcapL and VcapH are decreasing, whereas in region 1 VcapL and VcapH are symmetric around zero in the Y-axis.

In region 2, the common mode term Vsupply×K2×(Poutrelborder−Poutrel) is chosen proportional to Vsupply, to get the same Poutrel value where changeover from region 2 to region 1 takes place, independent of Vsupply. It is to be understood that Vsupply can be taken as both a parameter that may be changed, as well as a constant that is not used in the control of the resonant circuit. In the case where Vsupply is not considered, the 3 regions are defined as:
R1) Poutrel>Prelborder:

$$VcapH=Vsupply/2[1-Poutrel]$$

$$Vcapl=-Vsupply/2[1-Poutrel]$$

R2) Poutrel<Prelborder and VcapL<0:

$$VcapL=-Vsupply/2[1-Poutrel]+K2 \times (Poutrelborder-Poutrel)$$

$$Vcaph=Vsupply/2[1-Poutrel]+K2 \times (Poutrelborder-Poutrel)$$

R3) Otherwise:

$$VcapL=0$$

$$VcapH=Vsupply/[1-Poutrel]$$

Having illustrated the dependency of VcapH and VcapL on the single operation parameter Poutrel, one may see how the switches are closed. The inserts marked by 20 and 21 illustrate a time dependent Poutrel and the corresponding time dependency for Vcapl 21 and the half bridge voltage Vhb 20. As a start, the low side switch is turned off and the high side switch is turned on, this may be derived from the fact that the high bridge voltage shifts from a low value 22 to a high value 23. Vcapl rises fast 24 in a first situation where Vcap 1 is smaller than VcapH, however since the top has not been reached in VcapH the switch is maintained on (according to criterion 1). After a given time Vcapl increases 25 above VcapH but it is not until the top is reached 26, that the first part of criterion 1 is fulfilled, and not until Vcapl falls below VcapH 28 that the second part of the criterion is fulfilled and the switch is turned off. This is seen in the half bridge voltage 27 dropping to its low value 27. In this situation the turning off is controlled by the course of Vcapl.

Figure 3:
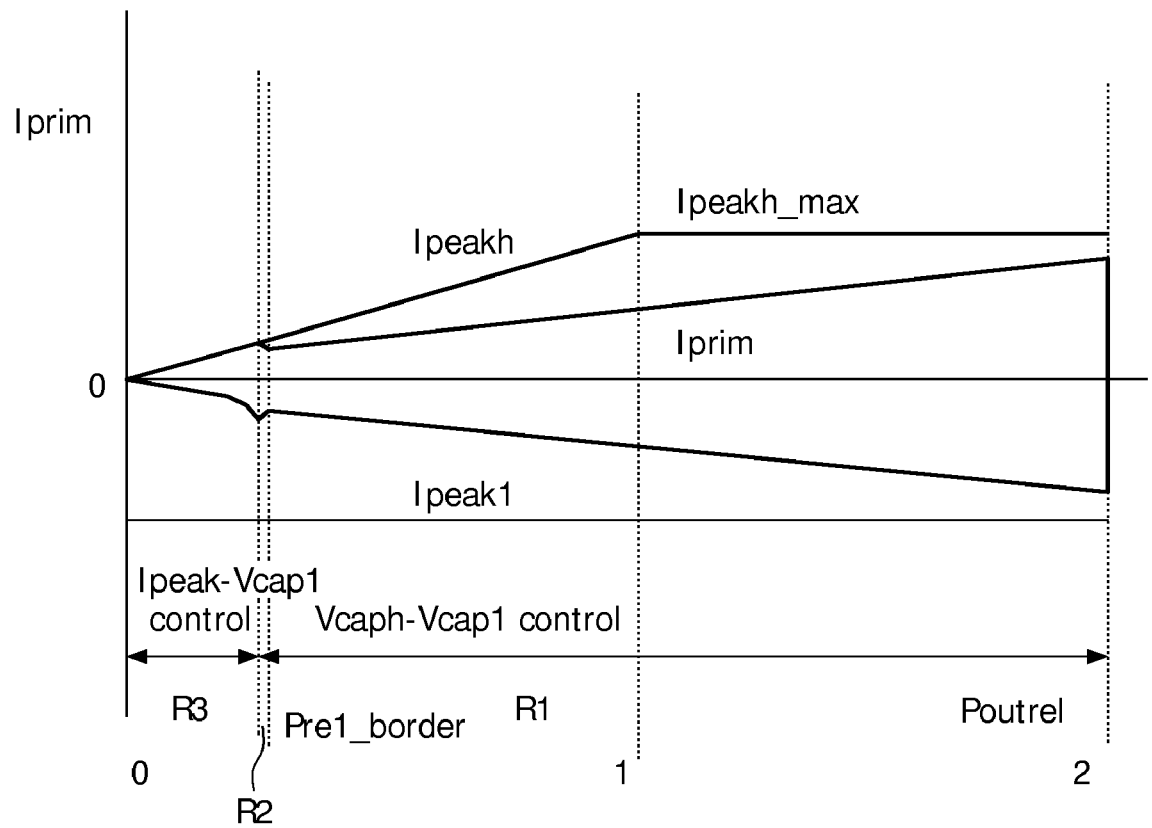
FIG. 3 illustrates Iprim as a function of Poutrel in the range of 0 to 2.

FIG. 3 shows the corresponding situation for the primary current as a function of Poutrel. In this case IpeakH is given a value IpeakH=K3×Vsupply×Poutrel with a maximum of IpeakH_max. IpeakL is given a value Ipeakl_max. K3 may be chosen according to a given mode of operation, in this situation K3 is chosen so that IpeakH takes over the control from VcapH in region 2. Iprim is illustrated by its amplitude, and it is seen that in region 1 and partly 2 Iprim is always within the boundaries set by IpeakH and IpeakL, however in region 3 may Iprim be larger than or equal to IpeakH. An important reason for takeover control by Ipeak halfway in region 2 and in region 3 is to provide a smooth transition from 50% duty cycle to a standby method with low duty cycles (standby mode as determined by IpeakH and VcapL). In region 1, the converter is protected from too large currents by Ipeakh_max and IpeakL (for example when a shorted load occurs). In this case Iprim will be significantly larger than indicated in FIG. 3 at a given Poutrel and therefore the primary current will be limited by IpeakH and IpeakL. Thus, it is seen that in region 3 the converter is controlled by the parameters IpeakH and VcapL, whereas in the regions 1 and 2 the converter is only controlled by VcapH and VcapL.

When very low power is delivered, the converter operates in mode R3. In a practical application, Poutrel is not reduced to 0 in this case, but kept at a certain minimum value. This minimum value gives a certain minimum on time for the HSS and therefore a certain minimum energy in the resonant inductors. This minimum energy circulates during the next LSS conduction interval and allows Cp to charge to the positive supply rail after the LSS is turned off, allowing soft turn on of the HSS at the start of the next period. As Poutrel is kept constant, another control mechanism to control the output power is necessary. In the control mechanism the turn off moment of the LSS is not at the first moment where the primary current reaches its maximum negative value, but one or more complete resonant cycles later, so at the $n^{th}$ valley in Iprim. This control method can be realized by the present invention by setting IpeakH to the desired minimum value and set VcapL to 0V. Skipping of the resonant cycles may be realized as follows:

The LSS is turned off if during a short time window Tw1 after the criterion 4 or 4a is fulfilled ([valley reached at Vcapl] AND [Vcapl>VcapL] or equivalent criterion [primary current <0] AND [Vcapl>VcapL]) also a second criterion is fulfilled: A time interval has lapsed where this time interval starts at the moment that the LSS is turned on.

Figure 4:
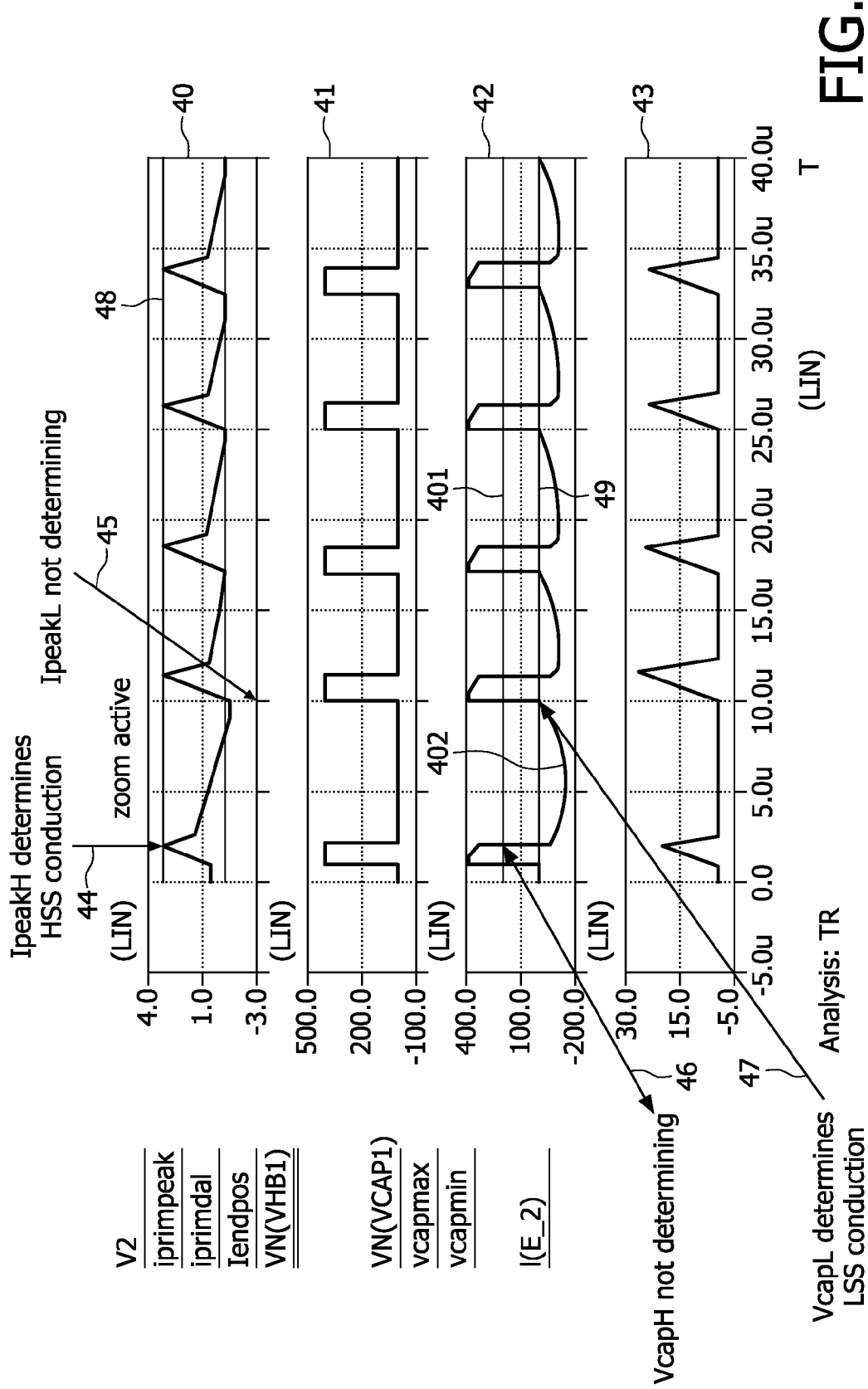
FIG. 4 illustrates the time variations of various parameters in a simulation of a situation of use for a first set of parameters.
Figure 5:
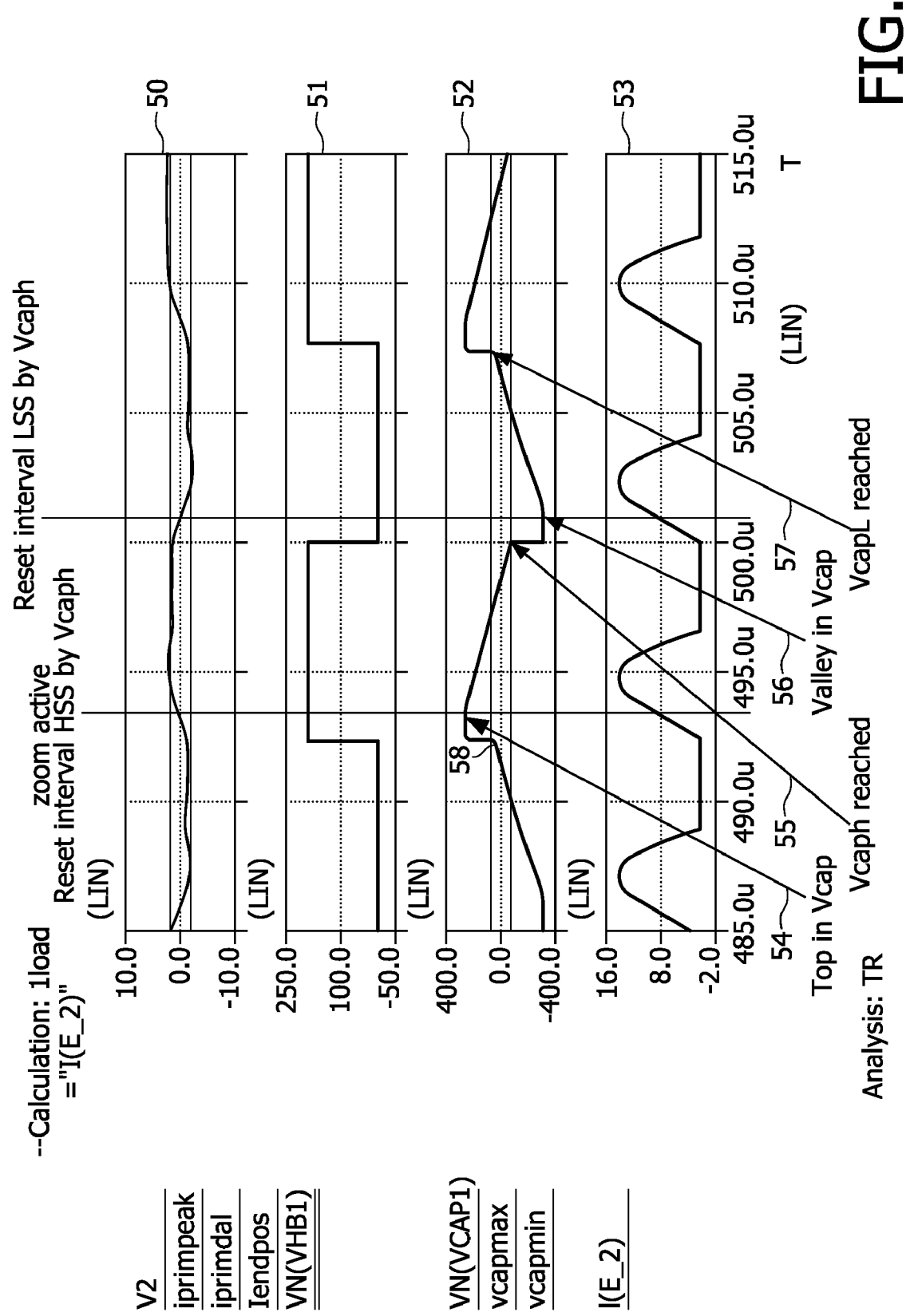
FIG. 5 illustrates the time variations of various parameters in a simulation of a situation of use for a second set of parameters.

FIGS. 4 and 5 illustrate the time variations of various parameters in a simulation of a situation of use. The top graphs 40,50 illustrate the primary current; the next graphs 41,51 illustrate the voltage at the half bridge point 8. A high voltage indicating that the high side switch is on and that the circuit is thereby connected to the supply rail, whereas a low voltage indicates that the low side switch is turned on. The next graphs 42,52 illustrate the voltage Vcapl whereas the last graphs 43,53 illustrate the current through the inductor L3 on the secondary side of the resonator.

FIG. 4 illustrates a situation where small duty cycles are used, i.e. a situation where the low switch is open longer than the high switch. In the situation indicated by reference numeral 44 the high side switch is turned on until the primary current becomes larger than IpeakH 48 (criterion 1) which results in that the high side switch is turned off and consequently the half bridge voltage drops to its low level. IpeakL has not been specified in this situation (e.g. by setting it to a large negative value), thus the turning off of the low switch is not determined from the course of the primary current 45, but from criterion 4 since a valley is reached in Vcapl 402 and Vcapl becomes larger than VcapL 47. Thus from the setting of VcapL to the predefined value 49, the switch closes when it has been ensured that Vcapl has reached a valley and that Vcapl is larger than VcapL, this occurs at the time instant referred to by reference numeral 47. It is seen than the primary current starts rising 45 at this time instant and that the half bridge voltage rises to its high value indicating that the high side switch has been turned on.

The control algorithm shown in FIG. 5 illustrates a high power situation with 50% duty cycles; in the figure focus is put on VacpH and VcapL as the control parameters. The high side switch is turned on 58. First it is detected that a top is reached in Vcapl 54, the high side switch remains turned on as long as Vcapl is detected to be larger than VcapH 55. However once Vcapl<VcapH criterion 2 is fulfilled and the high side switch is turned off. The corresponding algorithm then follows 56,57 for determining when the low side switch should be turned off.

The control algorithm may include a feature where the operation parameter is compensated for Vsupply and/or Fswitch. In this case a new operation parameter Poutrelcomp is defined as follows:

$$Poutrel = Poutrel_{comp} 1/[Vsupply^2 \times Fswitch]$$

where Vsupply is the actual supply voltage of the converter and Fswitch is the actual operating frequency of the converter. In this way the equation for the output power becomes:

$$Pout = eff \times Vsupply^2 \times Poutrel \times Cr \times Fswitch; \text{ giving:}$$

$$Pout = eff \times Vsupply^2 \times Poutrel_{comp} \times 1/[Vsupply^2 \times Fswitch] \times Cr \times Fswitch = eff \times Poutrel_{comp} \times Cr$$

With this operation parameter $Poutrel_{comp}$ a direct relation between control parameter and output power occurs.

The invention can also be used in combination with a full bridge converter. Also this is within the scope of the invention. An example of a circuit diagram of a full bridge converter is provided in FIG. 6.

In the situation of a full bridge converter, criteria are set up for all four switches. For example HSS1 and HSS2 conducting or LSS1 and LSS2 conducting. However an equivalent mode related to the half bridge converter can be realized where the combination of switches is controlled as follows:
State 1: HSS1 and LSS2 conducting.
State 2: HSS2 and LSS1 conducting.

The main difference with the half bridge converter is that the voltage over the resonant tank is doubled. In this mode, when state 1 is ended, HSS1 and LSS2 are switched off. Then both Cp2 and Cp1 will be charged to the opposite supply rail by the primary current in the same way as with a half bridge converter. Now HSS2 and LSS1 can be turned on in the same way as with a half bridge converter.

The criteria of the control parameters, or the control algorithm, for the switches can in this situation be extended to:

HSS2 and LSS1 turn off:
[primary current>IpeakH] OR
[top reached at Vtrafo1] AND [Vtrafo1<VcapH]
HSS1 and LSS2 turn off:
[primary current<IpeakL] OR
[valley reached at Vtrafo1] AND [Vtrafo1>VcapL]

Figure 7:
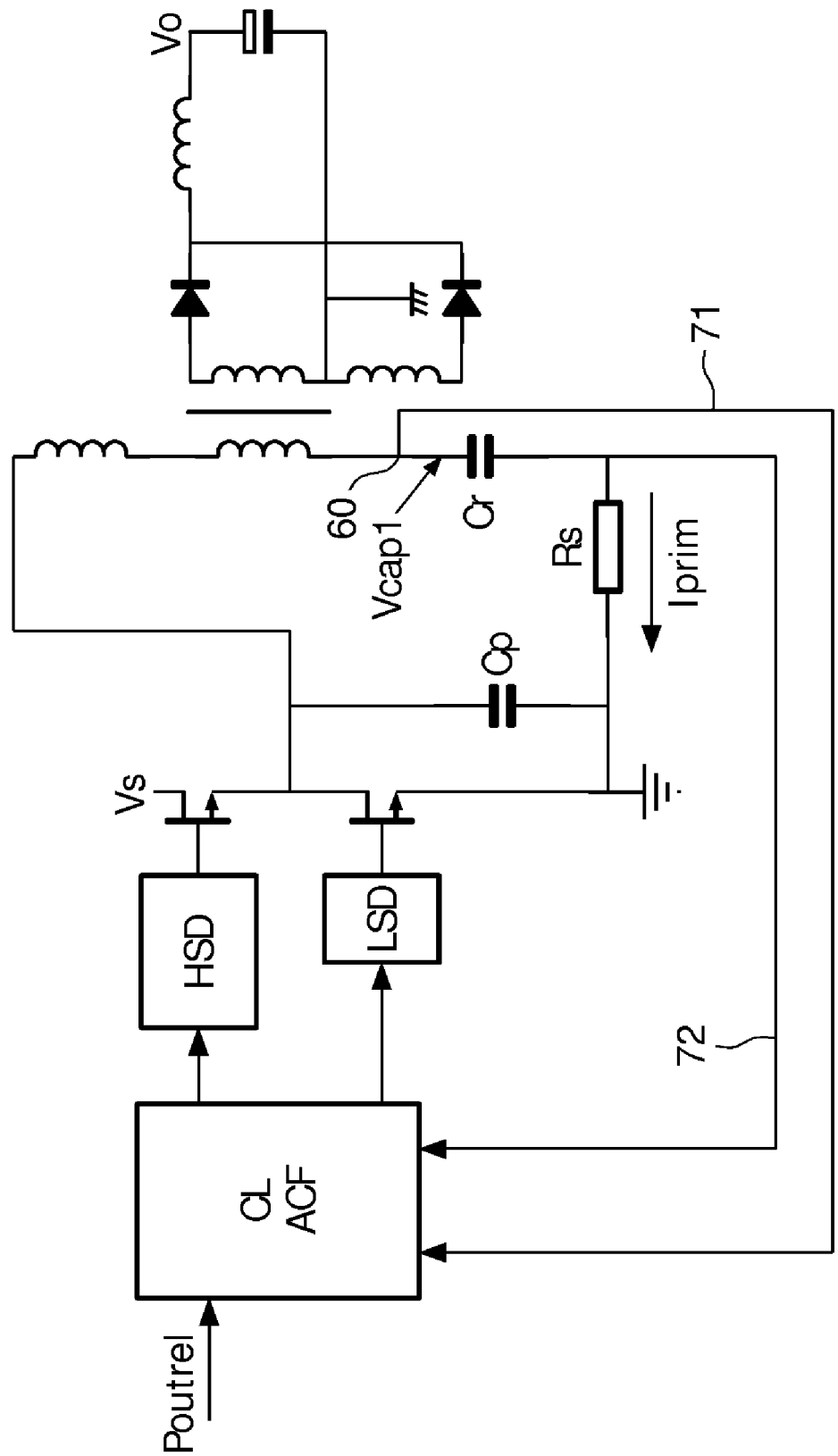
FIG. 7 illustrates the coupling of state parameter from the circuit to the control logic and analogue control functions.

FIG. 7 illustrates an embodiment of the present invention showing the coupling of state parameter from the circuit to the control logic CL, which is connected to or possible includes analog control functions ACF. Moreover, the position of the resonant capacitor Cr is changed in comparison with FIG. 1. Such a change in circuit, for example the place of the resonant capacitor Cr, is within the scope of the invention. The change in position of the resonant capacitor also gives rise to a change in the predetermined point in where the voltage in the resonant tank is monitored. In the embodiment of FIG. 7, the capacitance Vcapl is monitored in the point referred to by reference numeral 60 different from the point 9 shown in FIG. 1. These two points 9,60 are the most likely point to be measured, while 9 is preferred, because the voltage at 9 is a direct representation of Vhb (8)+Vcr (9-8). The voltage over the resonant capacitor (9-8) can also be measured while it is placed for example between L1 and L2 or at the other side of Rs (see FIG. 1). Then the desired parameter (voltage at 9) can be constructed by measuring Vhb (8) and Vcr and adding those two. The scope of this patent also covers an embodiment in which Cr is placed between L1 and L2 or between Rs and ground or in which Rs is left out (if the current is measured in another way) and in which Vhb+Vcr is used as replacement for the voltage at 9 or 60. As Vcr is in fact the integral of the current in the resonant tank (as the capacitor Cr acts as an integrator), one could also integrate the current and use Vhb+the integrated current as replacement for the voltage measured at 9 or 60. Also that embodiment is covered by this patent. Also variations in the control algorithm such as leaving out the top or valley detection in Vcapl or substitution of the top or valley by a (fixed) time after the start of the conduction interval, or other compatible criterion, are within the scope of the invention.

The current in the resonant tank, Iprim, is monitored as the current flowing through a current sense resistor Rs. In general all current sensing methods can be used here, for example hall elements, current measure transformers etc. The resistor Rs is positioned in a point of the circuit between the capacitor Cr and ground. A monitoring signal representing the monitored voltage signal, Vcapl and the monitored current, Iprim is fed back to the control logic CL through monitoring lines 71 and 72 respectively.

Figure 8:
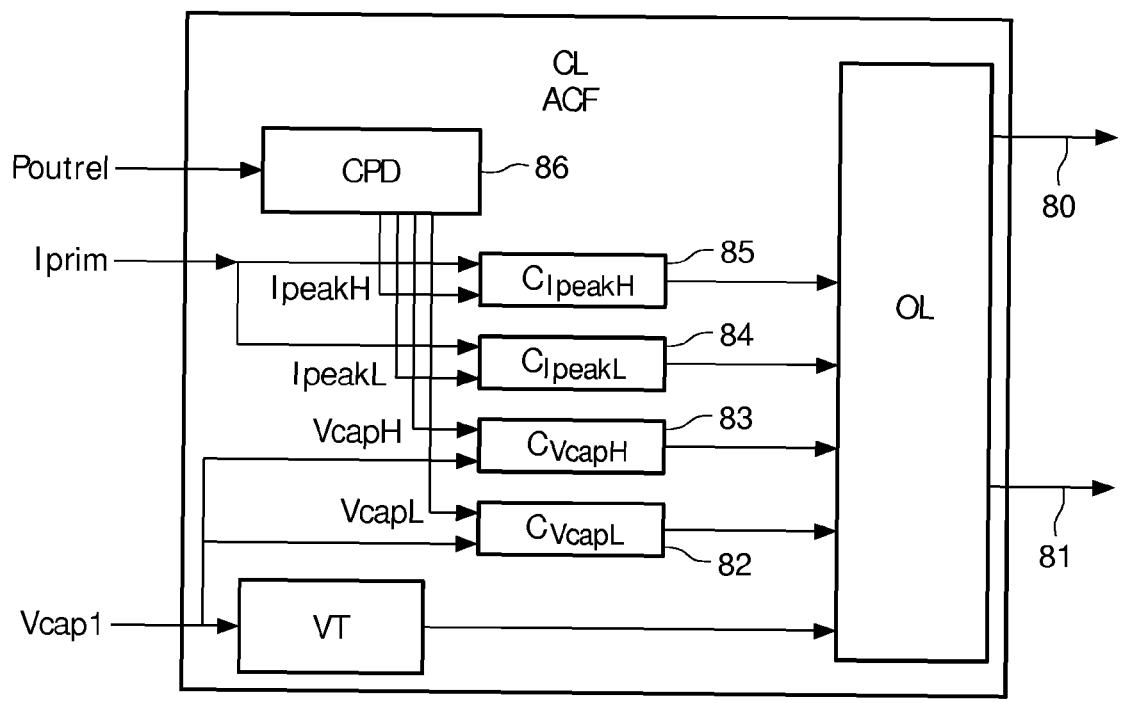
FIG. 8 illustrates a first implementation of the control logic and analogue control functions.

In FIG. 8 is an implementation of the control logic and analog control functions CL, ACF shown in more detail. The control logic and analogue control functions block represents functions to realize an embodiment of the proposed control algorithm.

It is seen that the monitoring voltage signal 71 representing Vcapl is inputted in the control logic CL. It is to be understood that even though the coupling of state parameters from the circuit to the control logic is illustrated for another embodiment of the resonant circuit than the resonant circuit illustrated in FIG. 1, Iprim and Vcapl may likewise be obtained for a circuit as illustrated in FIG. 1 or any other resonant circuit within the scope of the invention. The circuit of FIG. 7 gives rise to that a DC voltage component is present at Vcapl, giving complications in the Vcapl control. The control logic comprises a valley and top detector VT, or equivalent means for determining when, or ensuring that, a top/valley point has been reached in Vcapl. The output of the valley and top detector VT is inputted in output logic OL.

The monitored current signal 71 representing Vcapl is furthermore connected to two comparators 82 and 83. In the comparators 82 and 83 the Vcapl-signal is compared with a value of the control parameters VcapH and VcapL.

Also the monitored current signal representing the voltage Iprim is inputted into the control logic CL and into two comparators 84 and 85. In the comparators 84 and 85 the Iprim-signal 72 is compared with a value of the control parameters IpeakL and IpeakH.

The control parameters IpeakH, IpeakL, VcapL and VcapH are in this embodiment provided by an control-parameter determination block CPD 86 where a desired Poutrel is inputted and the control parameters are determined based on the value of Poutrel as explained above. The block 86 is however only present in an embodiment where a desired operation mode is a mode where the output power is controlled by a single parameter, i.e. Poutrel. The control parameters may also be provided to the comparator by other means.

The output of the comparators 82-85 is provided to the output logic OL. The output logic is operated in accordance with the input from the comparators 82-85 and the valley/top detector VT. Based on these inputs the output logic outputs a HSS and LSS state output 80, 81 for the HS and LS driver HSD, LSD.

In the embodiment including Vsupply and frequency compensation, a Vsupply-frequency compensation block VFC 90 may be added for compensation of Poutrel 86.

Figure 9:
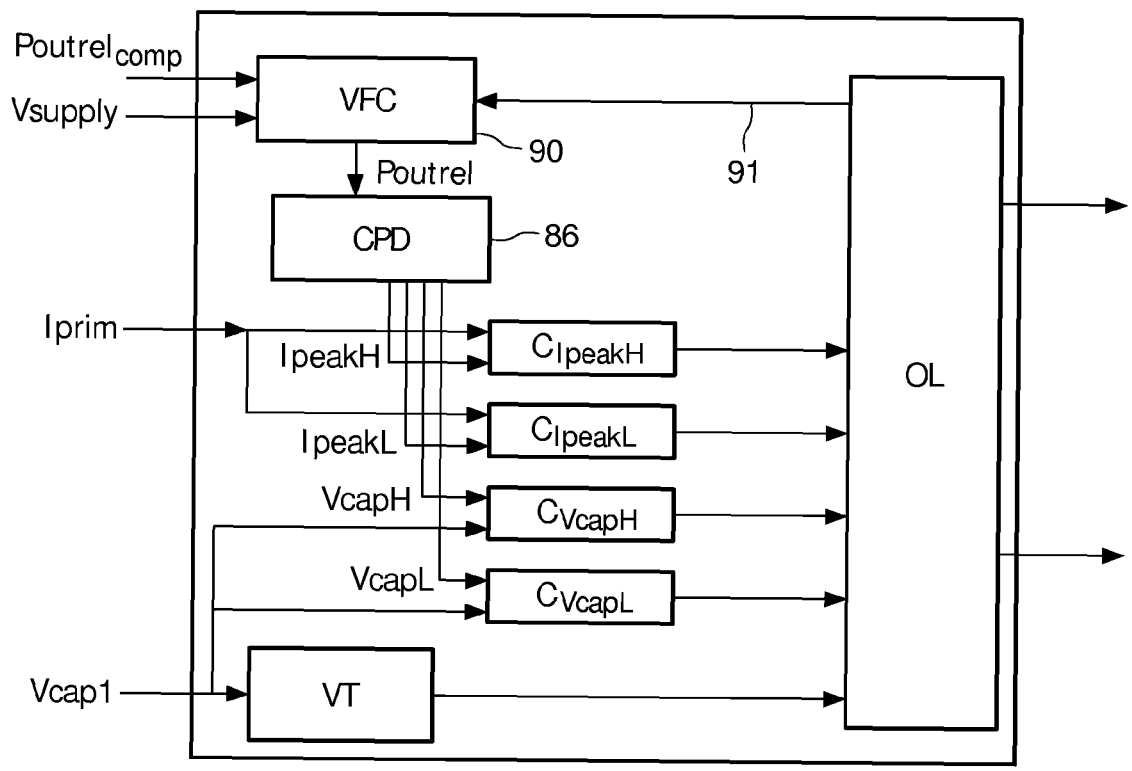
FIG. 9 illustrates a second implementation of the control logic and analogue control functions.

FIG. 9 illustrates an embodiment, where Poutrel is compensated 90 for supply voltage and switching frequency. In this embodiment, the operating frequency of the switches is fed 91 into a Vsupply-Fswitch compensation block VFS 90, and Poutrel is outputted in accordance with the algorithm discussed above.

The control logic CL may in an embodiment be provided by general purpose computer means or dedicated programmable computer means, where monitoring signals may be inputted and the computer means may be implemented to operate the control logic, e.g. by executing computer code implementing the method of the present invention.

Although the present invention has been described in connection with preferred embodiments, it is not intended to be limited to the specific form set forth herein. Rather, the scope of the present invention is limited only by the accompanying claims. Herein, the reference to two switches does not exclude embodiments with more than two switches.

In this specification, certain specific details of the disclosed embodiment such as specific implementation schemes, circuit diagrams, etc., are set forth for purposes of explanation rather than limitation, so as to provide a clear and thorough understanding of the present invention. However, it should be understood readily by those skilled in this art, that the present invention might be practiced in other embodiments that do not conform exactly to the details set forth herein, without departing from the scope of this invention as defined by the claims. Further, in this context, and for the purposes of brevity and clarity, detailed descriptions of well-known apparatus, circuits and methodology have been omitted so as to avoid unnecessary detail and possible confusion.

Reference signs are included in the claims; however, the inclusion of the reference signs is only for clarity reasons and should not be construed as limiting the scope of the claims. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A resonant converter for supplying electrical energy from a supply source (Vs) to a load, the resonant converter comprising first and second series-arranged controllable switches to be connected between supply source terminals, a control device (CL) for generating control signals for opening and closing the first and second switches, a resonant tank in electrical connection with the first and second switches, the resonant tank comprising a resonant capacitor (Cr), wherein one of the first and second switches is turned on and a current flowing in the resonant tank is monitored and a voltage at a predetermined point in the resonant tank is monitored, a first conduction interval occurs while the first switch is turned on and a second conduction interval occurs while the second switch is turned on, and wherein two control parameters are set for the first conduction interval and two are set for the second conduction interval, the control parameters for the two conduction intervals being: a peak current of the interval and a predetermined voltage of the interval, and wherein the first and second switches are turned off in accordance with criteria including the four control parameters.

2. A resonant converter according to claim 1, wherein the first switch is turned off when a first criterion or a second criterion is fulfilled, the first criterion being that the current is larger than the peak current, the second criterion being that a minimum time has lapsed after the switch is turned on and that the voltage is below a level set by the predetermined voltage of the interval, and wherein the second switch is turned off when a first criterion or a second criterion are fulfilled, the first criterion being that the current is smaller than the peak current, the second criterion being that a minimum time has lapsed after the switch is turned on and that the voltage is above a level set by the predetermined voltage of the interval.

3. A resonant converter according to claim 1, wherein the four control parameters are set in order operate the resonant converter in accordance with a desired operation mode.

4. A resonant converter according to claim 1, wherein the four control parameters are set in order to stabilize a desired operation mode of the resonant converter, and wherein a stabilization loop incorporates the four control parameters in the stabilization procedure.

5. A resonant converter according to claim 3, wherein the desired operation mode is a mode where the output power is controlled.

6. A resonant converter according to claim 5, wherein the output power is controlled by setting the control parameters according to a value of a single operation parameter.

7. A resonant converter according to claim 6, wherein regions of the single operation parameter is defined and wherein the output power is controlled by setting the control parameters according to a value of a single operation parameter in the region.

8. A resonant converter according to claim 6, wherein the single operation parameter is adjusted in accordance with the supply voltage and the operation frequency of the converter.

9. A control logic (CL) for controlling a resonant converter, the control logic comprising output logic (OL) for controlling first and second series-arranged switches to be connected between supply source terminals, one or more comparators configured to receive a current in a resonant tank of the resonant converter and a voltage at a predetermined point in the resonant tank and configured to compare the current and the voltage to control parameters, two control parameters are set for the first conduction interval occurring while the first switch is turned on, and two are set for the second conduction interval occurring while the second switch is turned on, the control parameters for the two conduction intervals being: the peak current of the interval and a predetermined voltage of the interval, and wherein the at least first and second switches are turned off in accordance with criteria including the four control parameters.

10. A method of controlling a resonant converter for supplying electrical energy from a supply source (Vs) to a load, the resonant converter comprising first and second series-arranged switches to be connected between supply source terminals, a control device (CL) for generating control signals for opening and closing the first and second switches, a resonant tank in electrical connection with the first and second switches, the resonant tank comprising a resonant capacitor, the method comprising the steps of: monitoring the current flowing in the resonant tank and a voltage at a predetermined point in the resonant tank, comparing the current in a resonant tank of the resonant converter and a voltage at the a predetermined point in the resonant tank to control parameters, two control parameters are set for the first conduction interval occurring while the first switch is turned on, and two are set for the second conduction interval occurring while the second switch is turned on, the control parameters for the two conduction intervals being: the peak current of the interval and a predetermined voltage of the interval, turning the first and second switches off in accordance with criteria including the four control parameters.

11. Computer readable code for enabling a programmable device to perform the method of claim 10.

* * * * *